US006588855B2

(12) United States Patent
Harris

(10) Patent No.: US 6,588,855 B2
(45) Date of Patent: Jul. 8, 2003

(54) ELECTRO-HYDRAULIC BRAKING SYSTEM

(75) Inventor: Alan Leslie Harris, Coventry (GB)

(73) Assignee: Lucas Industries Public Limited Company (GB)

( * ) Notice: Subject to any disclaimer, the term of this patent is extended or adjusted under 35 U.S.C. 154(b) by 166 days.

(21) Appl. No.: 09/840,336

(22) Filed: Apr. 23, 2001

(65) Prior Publication Data

US 2002/0000750 A1 Jan. 3, 2002

Related U.S. Application Data

(63) Continuation of application No. PCT/GB99/03530, filed on Oct. 25, 1999.

(30) Foreign Application Priority Data

Oct. 24, 1998 (GB) ............................................. 9823201

(51) Int. Cl.$^7$ ............................................. B60T 13/74
(52) U.S. Cl. ................... 303/20; 303/3; 303/15
(58) Field of Search ................... 303/3, 10, 15, 303/20, 116.1, 116.2, 113.4

(56) References Cited

U.S. PATENT DOCUMENTS

| 4,730,877 A | | 3/1988 | Harris |
| 5,558,409 A | * | 9/1996 | Walenty et al. ............... 303/10 |
| 6,033,035 A | * | 3/2000 | Neumann et al. ......... 303/113.4 |
| 6,053,584 A | * | 4/2000 | Schunck et al. ............ 303/167 |
| 6,203,484 B1 | * | 3/2001 | Ganzel ..................... 303/113.4 |
| 6,226,586 B1 | * | 5/2001 | Luckevich et al. ........... 701/70 |

FOREIGN PATENT DOCUMENTS

| DE | 3526556 | 1/1987 |
| DE | 19649010 | 5/1998 |
| WO | WO 9738886 | 10/1997 |
| WO | 97/38886 | * 10/1997 |

\* cited by examiner

Primary Examiner—Jack Lavinder
Assistant Examiner—Robert A. Siconolfi
(74) Attorney, Agent, or Firm—MacMillan, Sobanski & Todd, LLC

(57) ABSTRACT

An electro-hydraulic braking system of the type which operates normally in a brake-by-wire (EHB) mode wherein hydraulic pressure is applied to braking devices at the vehicle wheels in proportion to the driver's braking demand as sensed electronically at a brake pedal, but which, if the brake-by-wire mode should fail, operates in a push-through mode wherein hydraulic pressure is applied to the braking devices at the vehicle wheels by way of a master cylinder coupled mechanically to the brake pedal. In order to minimize jolting within the system when changeover from push-through to brake-by-wire braking takes place, the existence of a push-through condition is recognized during an initialization stage of the EHB mode and the initial EHB demand is set at the prevailing push-through braking or deceleration level and then adapted smoothly to the desired EHB demand.

35 Claims, 7 Drawing Sheets

ELECTRO-HYDRAULIC BRAKING SYSTEM

CROSS REFERENCE TO RELATED APPLICATIONS

This application is a continuation of co-pending international application PCT/GB99/03530, filed Oct. 25, 1999 which designated the United States and which claims priority to British Application No. GB9823201.0, filed Oct. 24, 1998.

TECHNICAL FIELD

The present invention relates to an electro-hydraulic braking (EHB) system for a motor vehicle.

BACKGROUND OF THE INVENTION

Electro-hydraulic braking systems for motor vehicles are known which comprise a brake pedal, a braking device connected to at least one vehicle wheel which is capable of being brought into communication with an electronically controlled valve arrangement in order to apply hydraulic fluid under pressure to the braking device, a hydraulic pump, and a hydraulic pressure accumulator fed by said pump for the provision of hydraulic fluid under pressure which can be passed to the braking device via the electronically controlled valve arrangement in order to apply hydraulic fluid under pressure to the braking device in so called "brake by wire" mode in proportion to the driver's braking demand as sensed at the brake pedal.

In view of the fact that, with an electrically-actuated braking system, the driver's wishes are acquired by sensors at the brake pedal, and conducted to the electronic control system by means of electrical signals, such systems are described as electro-hydraulic braking (EHB) systems.

In the case of an electro-hydraulic braking system of this form, the braking energy required for braking the vehicle is provided in normal use by the electrically-actuated braking system ("brake-by-wire" mode). In order, however, to brake the vehicle in the event of an unexpected failure of the electrically-actuated braking system, the braking system also features an ancillary hydraulic braking system for the immediate actuation of the brakes in which a direct connection can be established between the brake pedal and the brakes by means of switchover valves and hydraulic lines, (this is referred to as the "push-through" mode).

Thus, to provide a redundant hydraulic emergency system, a direct connection can be established in the "push-through" mode between the brake pedal and the brakes by means of switch over valves and hydraulic lines. This conventional system requires a switching device by which, under normal operating conditions, the brake pressure which is produced in the electrical system, and, in the event of a defect in or the failure of the electrical system, the brake pressure produced in the hydraulic ancillary system, is transferred to the brakes.

Of course, the braking system is automatically in the push-through mode if the vehicle is held on the brakes before the system is activated or if the vehicle is free-wheeling under braking before the system is activated. In these and similar circumstances, a problem with known systems is that as soon as the vehicle engine is started and initialization of the electronic braking system begins, the system instantly changes over from "push-through" braking to "brake by wire" braking, and adopts the braking demand level corresponding to the prevailing push-through brake pedal travel/effort. However, this is much greater than the driver's actual demand under push-through braking due to the effects of rear-axle braking and the electronic boost ratio and the result is an uncomfortable jolt within the system and vehicle due to the sudden increase in braking. The driver has then to compensate for the braking level which is much higher than expected.

In accordance with the present invention, a push-through condition is recognized during the initialization stage of the EHB, i.e., during power-up of the EHB controller, and the initial EHB demand is set at the prevailing push-through braking or deceleration level and then adapted smoothly to the desired EHB demand.

In some embodiments, after the initialisation stage of the EHB mode, the initial EHB demand is held for a predefined time interval at the prevailing push-through braking or deceleration level, at least for the front brakes.

In some embodiments, it is preferred that the adaption is arranged not before the brake pedal is first released after the initialisation stage of the EHB mode, at least for the front brakes.

Preferably, the adaption follows a substantially straight line characteristic from the initial demand set at the prevailing push-through braking or deceleration level to the desired EHB demand, at least for the front brakes.

Preferably, initial EHB brake pressure for the rear brakes is set at zero and gradually adapted, either by a curved or straight line, to match the EHB brake pressure for the front brakes.

Preferably, the existence of the push-through condition during EHB initialisation is recognized by any one or combination of the conditions that: (a) both front brake pressures are equal to the master cylinder pressure and are greater than zero, (b) pedal travel is greater than zero and within a range of travel expected for push-through at that pressure, and (c) both rear brake pressures are zero.

Advantageously, the initial EHB demand for the front axle brakes is set at the prevailing master cylinder pressure level, the initial EHB demand for the rear axle brakes is set at zero, and the final EHB demand level for both the front and rear axle brakes being set at a predetermined function of prevailing master cylinder pressure.

Preferably, the maximum rear axle demand rise rate is set to be equal to the ratio of the final EHB demand level and a desired adaption period.

SUMMARY OF THE INVENTION

The above objects as well as other objects not specifically enumerated are achieved by a method of controlling an electro-hydraulic braking (EHB) system for a vehicle of the type which operates normally in an EHB mode wherein hydraulic pressure is applied to braking devices at wheels of a vehicle in proportion to a driver's braking demand as sensed electronically at a brake pedal, but which, if a brake-by-wire mode should fail, operates in a push-through mode wherein hydraulic pressure is applied to the braking devices at the vehicle wheels by way of a master cylinder coupled mechanically to a brake pedal, characterized by: arranging for the existence of a push-through condition to be recognized during an initialization stage of the EHB mode; and setting an initial EHB demand at a prevailing push-through braking or deceleration level, and then adapting the initial EHB demand smoothly to a final desired EHB demand.

A system that can be operated according to the above method is also disclosed.

Various objects and advantages of this invention will become apparent to those skilled in the art from the following detailed description of the preferred embodiment, when read in light of the accompanying drawings.

DETAILED DESCRIPTION OF THE INVENTION

Figure 1:
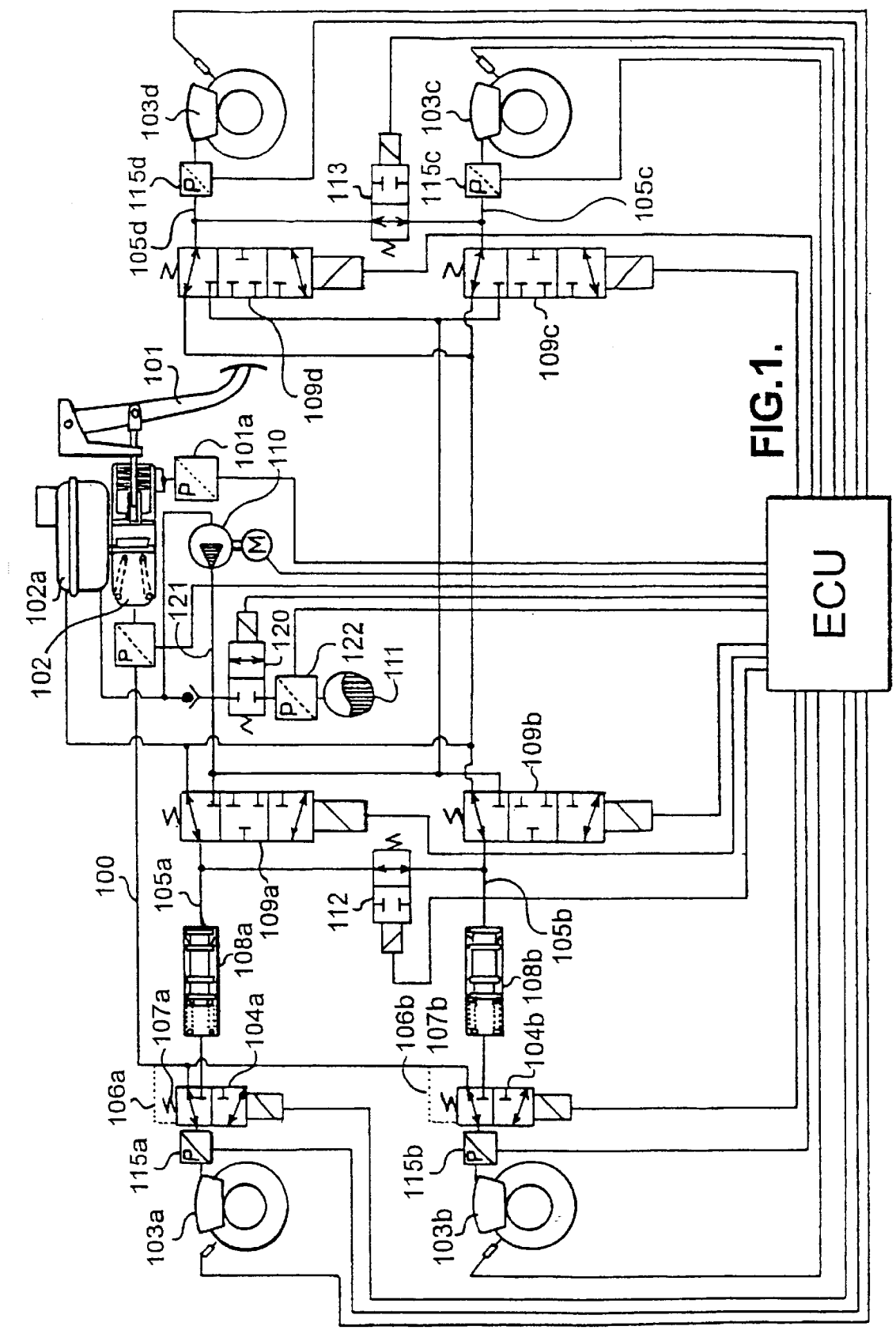
FIG. 1 is a schematic diagram of a vehicle braking system to which the present invention can be applied.

The braking system shown in FIG. 1 includes, for the purpose of emergency actuation and for use when the electronic braking system is not operational for any reason a "push-through" brake circuit 100, which is fed from a brake cylinder 102, actuated by means of the brake pedal 101. The brake pedal 101 has an associated sensor 101a for the acquisition of the driver's braking demand. The driver's demand is transferred to an electronic control unit (ECU), evaluated there, and used as the source for the generation of electrical control signals for actuating valves, described further hereinafter, and a hydraulic pump 110. Switch-over valves 104a, 104b are arranged between the "push-through" brake circuit 100 and the wheel brakes of a vehicle axle 103a, 103b, in order to apply brake fluid to the wheel brakes 103a, 103b, either via the "push-through" brake circuit 100, or via electrically-actuated brake channels 105a, 105b (brake-by-wire).

The switch over valves 104a, 104b in the electrically non-actuated state, i.e. their preferred position, connect the "push-through" brake circuit 100 with the wheel brakes 103a, 103b, in which situation the connection to the electrically actuated brake channels 105a, 105b is blocked. In the event of electrical actuation, the switch-over valves 104a, 104b connect the wheel brakes 103a, 103b, with the electrically-actuated brake channels 105a, 105b, allocated to them, in which context, the connections to the "push-through" brake circuit 100 are blocked. In order to increase safety, for example in the event of a defective valve reset spring 107a, 107b, the switch-over valves 104a, 104b are each capable of being moved into the preferred position corresponding to the "push-through" actuation, by means of pressure control lines 106a, 106b.

In addition to this, elements referred to as de-coupling or separation cylinders 108a, 108b, are connected in the electrically actuated brake channels 105a, 105b, upstream of the switch-over valves 104a, 104b. By means of the cylinders 108a, 108b, hydraulic separation between the "push-through" brake circuit 100 and the electrically-actuated brake channels 105a, 105b, is ensured.

Brake pressure modulation in the electrically actuated brake channels 105a, 105b, and in the electrically-actuated brake channels 105c, 105d, which are allocated to the wheel brakes of the other vehicle axle 103c, 103d, is effected in a known manner by means of control valves 109a, 109b, 109c, 109d, the brake pressure being provided by a pump 110 operated by an electric motor M, and from a pressure accumulator 111.

The system as described thus far is conventional and operates in accordance with well-known techniques.

As explained in the introduction hereto, a problem with the conventional operation of systems of the abovedescribed type is that, if the brake pedal is already being applied when the engine is started and the electronic braking system is powering up and initialising, a jolt occurs in the system because the pedal travel, and master-cylinder pressure ie. the parameters which govern demand in the "brake by wire" mode, are both higher for a given "push through" deceleration, than those needed to give the same deceleration in the "brake-by-wire" mode.

Figure 3:
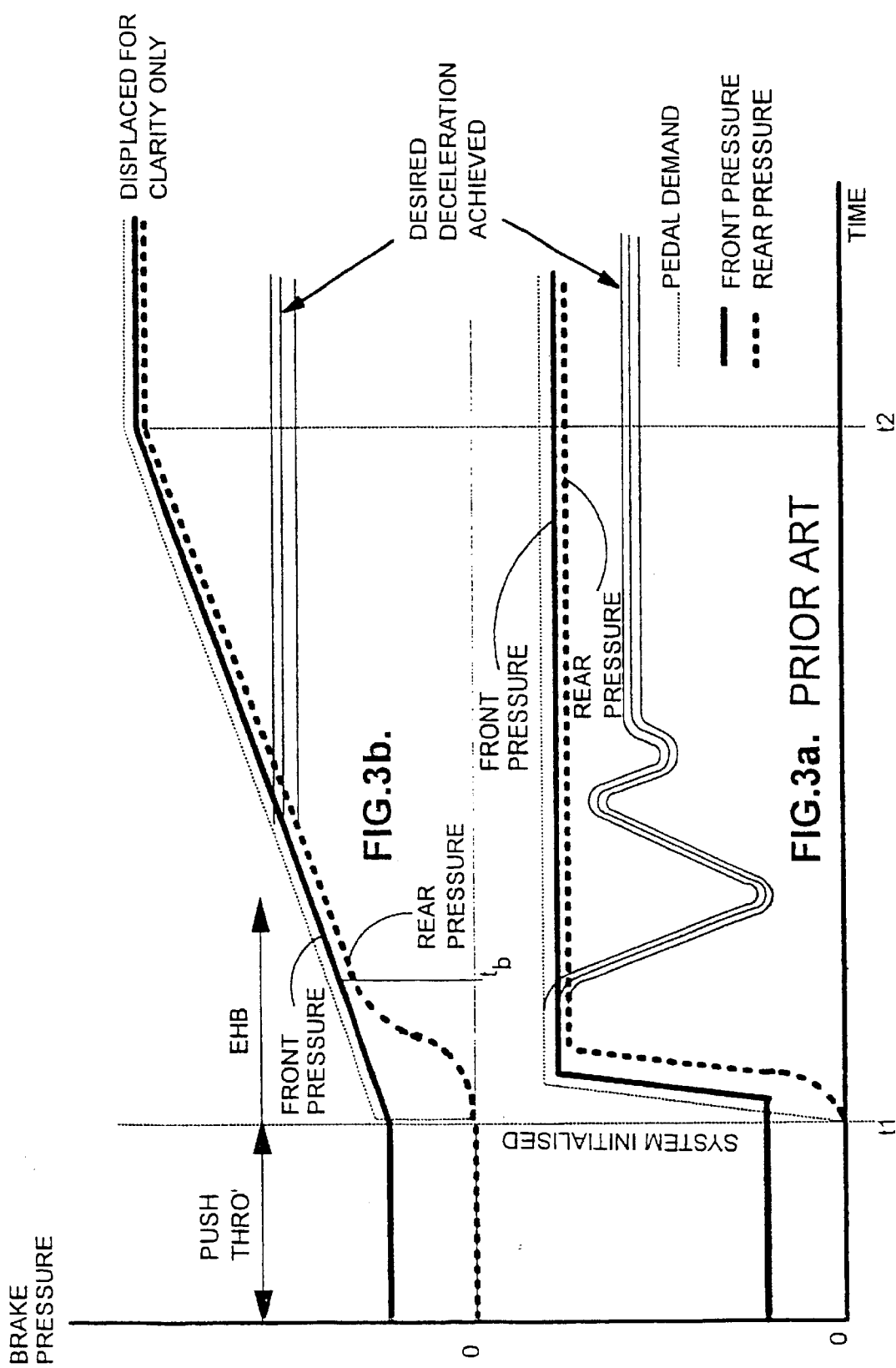
FIGS. 3a and b comprise brake pressure versus time curves illustrating system initialisation for the prior art systems and for an embodiment of a system operating in accordance with the present invention respectively.

As illustrated in FIG. 3a, upon initialisation at time $t_1$, the known prior art software ramps up the demand pressure substantially instantaneously (dotted line) from zero to a level corresponding to the prevailing pedal travel and/or master cylinder pressure, and controls the pressure at both axles (solid lines) to this level. This results in a rapid increase in deceleration to a level approximately (in a typical case) six times greater than that achieved with the same pedal effort in the "push-through" mode. As indicated by the dotted undulating curves, achieving an intermediate deceleration by modulation of the pedal effort by the driver is likely to involve a process of over and under-shoot.

One simple solution (not shown) would be to limit the rate at which demand could build-up following new initialisation. This would allow the driver to compensate by reducing the pedal input as the demand (and thus brake pressure) ramped up. However, there would be a delay until the ramp reached the level of braking already established via push-through and, if the demand was still based upon travel, the amount of compensation needed would be considerable.

This solution is therefore still with substantial disadvantages.

In the first system embodiment in accordance with the present invention whose operation is illustrated in FIG. 3b, the demand ramp is arranged to be started, not at zero as in the known systems, but rather from the current level of (push-through) braking. This allows a more gradual ramp to be used, making the driver's task easier without having to extend the adaption period, which would extend stopping distance. An important factor in the application of this technique is to identify the push-through condition during system initialisation (for example that both front brakes= master cylinder pressure=greater than zero; pedal travel= expected pedal travel for push-through at that pressure; both rear brake pressures=0) so that the start of the ramp is at the current (ie. prevailing) level of braking, and not that which would normally correspond to the observed travel/master cylinder pressure.

The upper end of the ramp (time $t_2$), ie. fully developed demand, should preferably be based upon master cylinder pressure alone, without any travel dependency, such that only effort needs to be modulated by the driver.

In FIG. 3b, the rear brake pressure is not raised immediately to the same level as the front brake but follows a curve gradually increasing the rear brake pressure so that it becomes the same on the front brake pressure at approximately time $t_b$.

Figure 4:
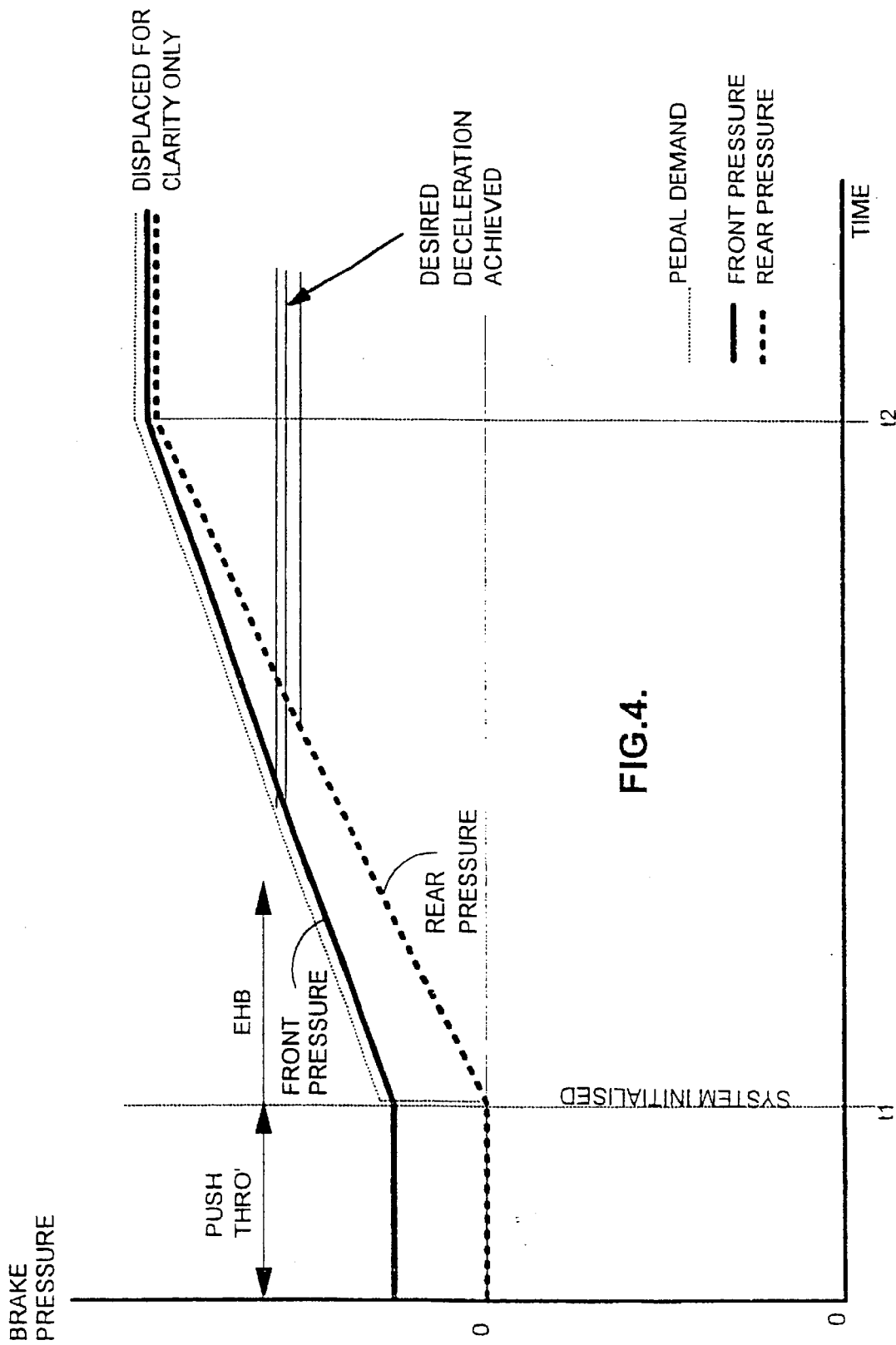
FIG. 4 comprises brake pressure versus time curves illustrating system initialisation for another embodiment of a system operating in accordance with the present invention.

In a second embodiment whose operation is illustrated in FIG. 4, the rear brake pressure is raised from zero along a straight line characteristic so as to reach the level of the front brake pressure only at time $t_2$.

In other systems of a type in which the pedal controls vehicle deceleration, rather than brake pressure, the deceleration demand is ramped up, with the push-through deceleration forming the initial ramp value.

If a jolt is to be avoided altogether in systems which control only brake pressure, the ramp can be tailored (in a manner not shown) in order to compensate automatically for the additional brake force of the rear axle, which would have been unbraked in "push-through" at the start of the ramp.

In all cases, the demand needs to remain mastercylinder-pressure based for the remainder of the brake application, irrespective of the demand level.

Figure 2:
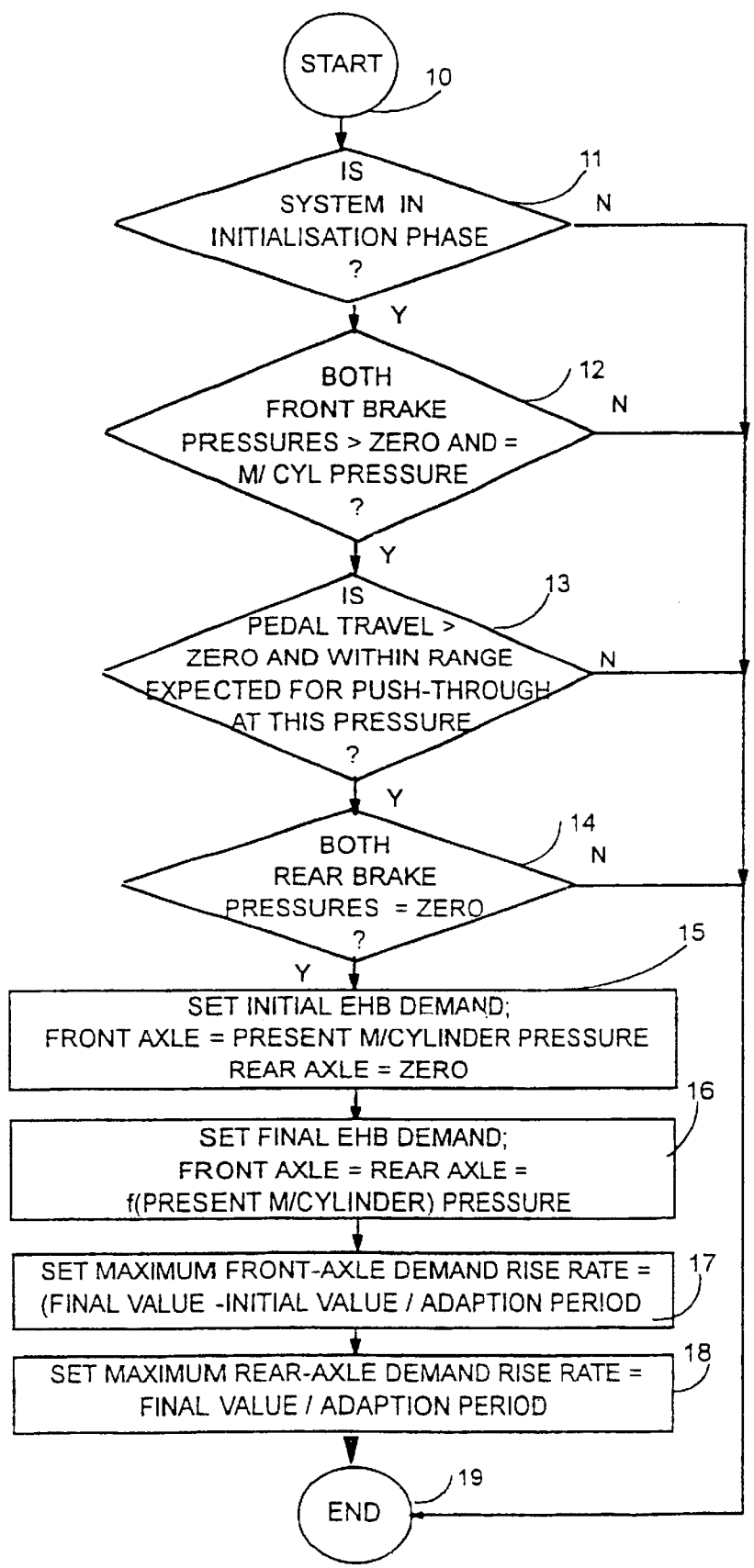
FIG. 2 is a flow diagram showing the decision process in one embodiment of a system in accordance with the present invention.

Reference is now made to the sequence flow diagram of FIG. 2 which illustrates one possible sequence operation of a system embodying the present invention.

The flow diagram of FIG. 2 involves the following sequence steps:

| | |
|---|---|
| 10- | Start |
| 11- | Is the system in initialisation phase? |
| 12- | Are both front brake pressures > zero and = master cylinder pressure? |
| 13- | Is pedal travel > zero and within range expected for push-through at this pressure? |
| 14- | Are both rear brake pressures = zero? |
| 15- | Set initial EHB demand : Front axle = present master cylinder pressure, Rear axle = zero |
| 16- | Set final EHB demand : Front axle = rear axle = f (present master cylinder) pressure |
| 17- | Set maximum front-axle demand rise rate = (final value − initial value)/adaption period |
| 18- | Set maximum rear-axle demand rise rate = final value/adaption period |
| 19- | End. |

The smooth transition which can be achieved by systems in accordance with the present invention is more comfortable for the vehicle driver and passengers and allows the driver to modulate pedal input during pressure rise, so as to avoid overbraking.

Figure 5:
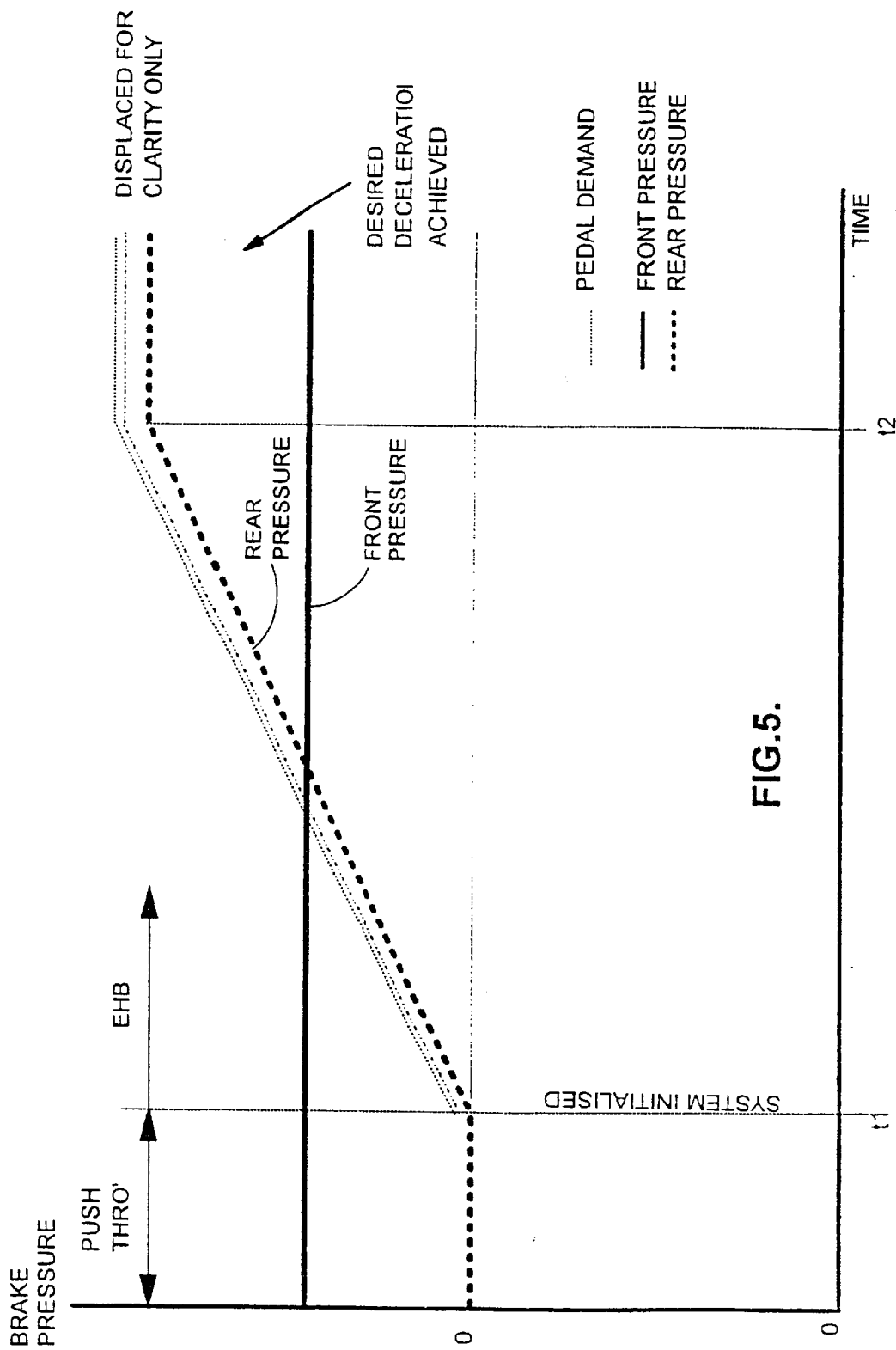
FIGS. 5 and 6 are brake pressure versus time curves illustrating system initialisation for farther embodiments in accordance with this invention.

In a third embodiment whose operation is illustrated in FIG. 5, the front axle brakes are arranged to remain in the push-through mode until the brake pedal is first released, only the rear brake being braked with EHB during the start-up phase. This arrangement has an advantage in situations such as that in which fluid displaced into the brakes during push-through could become trapped when EHB is subsequently initialised.

Figure 6:
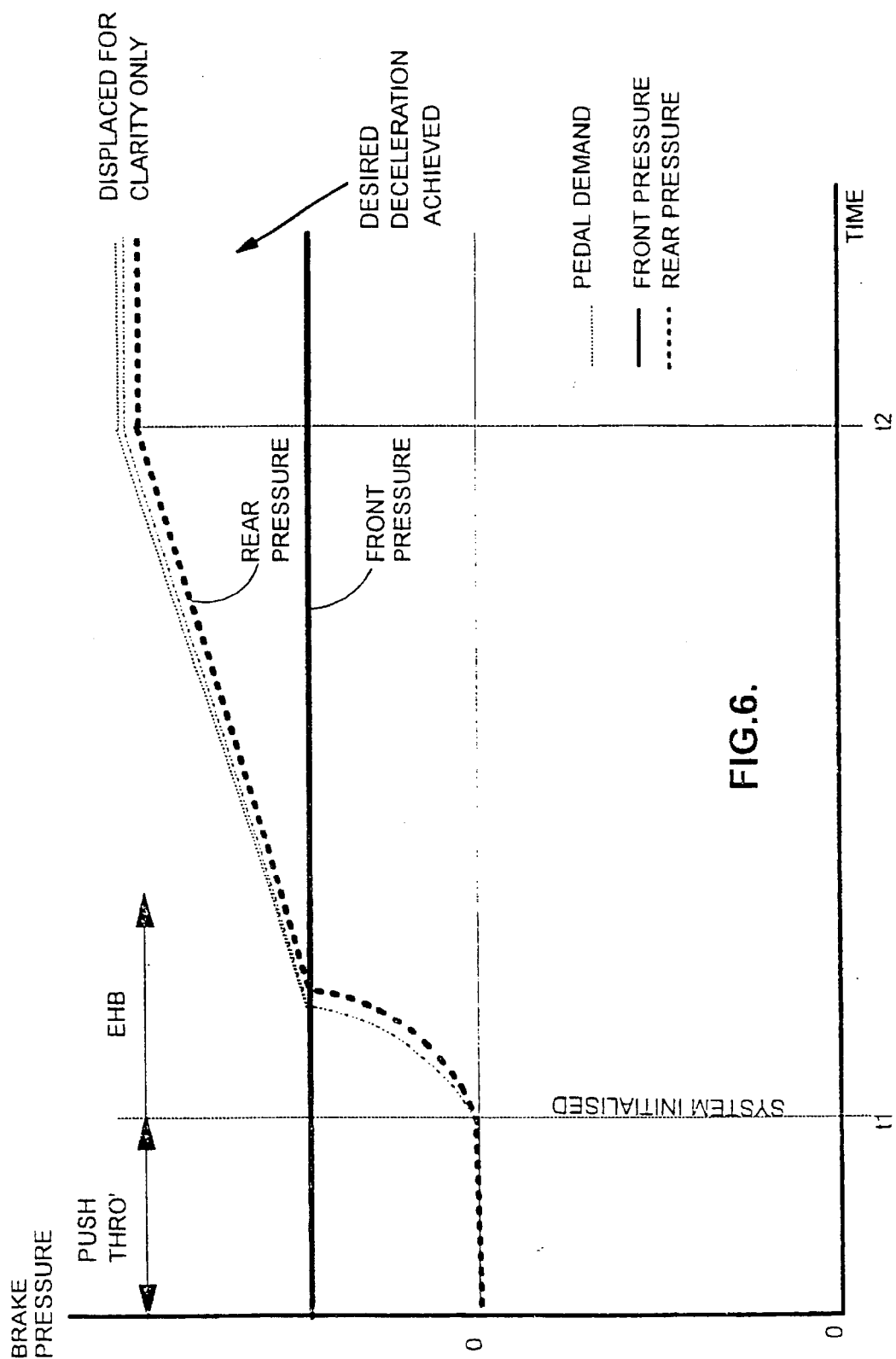

In FIG. 5, the rear brakes are operated at zero pressure during the push-through stage and are raised to the desired level during the EHB stage according to a straight-line characteristic. In FIG. 6, the rear brakes are again operated at zero pressure during the push-through stage but during the EHB stage first rise according to a curved characteristic up to the push-through level of the front brakes, but then rise thereafter according to a straight line characteristic.

Figure 7:
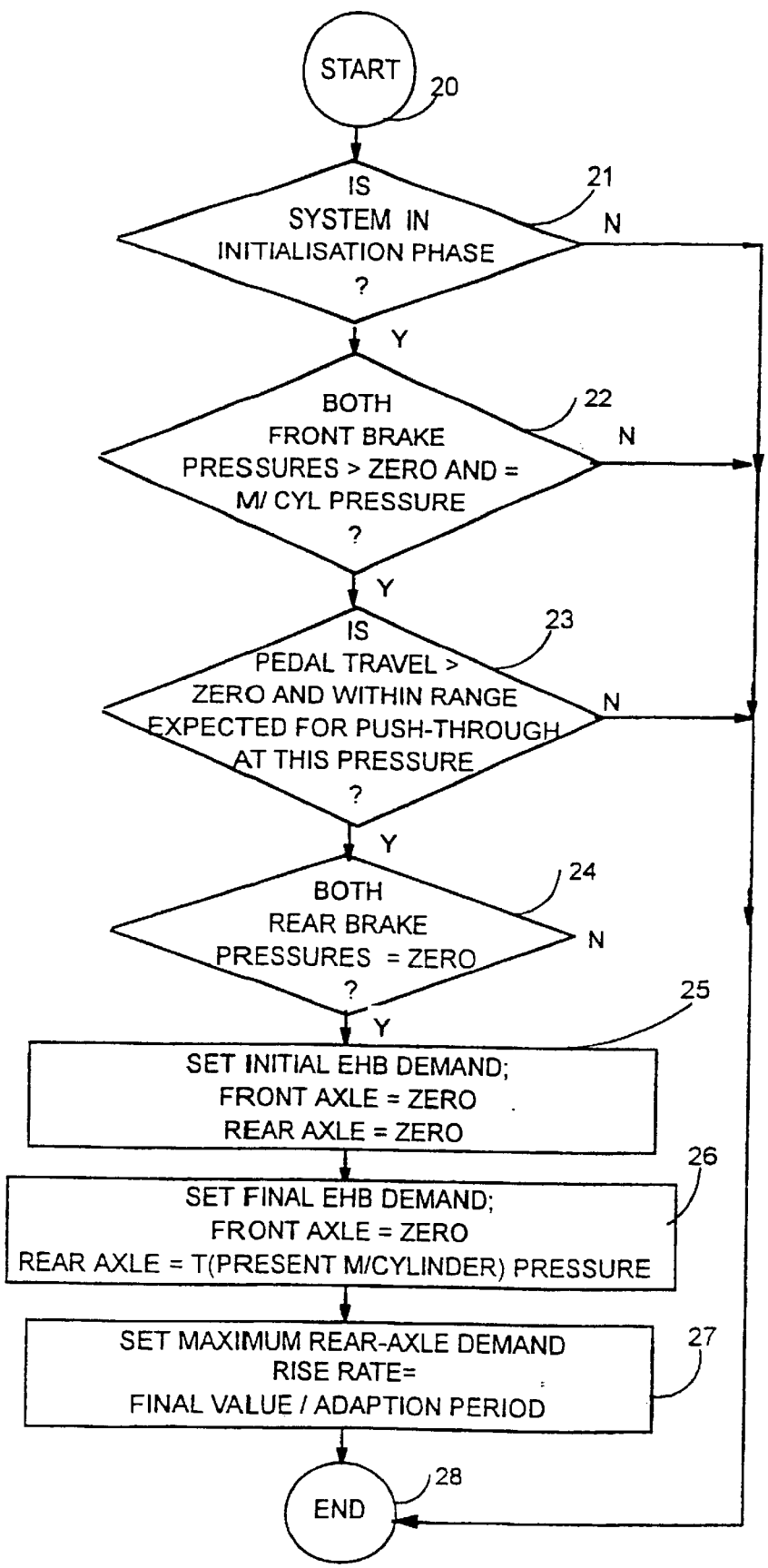
FIG. 7 is a flow diagram showing the decision process in embodiments corresponding to FIGS. 5 and 6.

Reference is now made to the sequence flow diagram of FIG. 7 which illustrates a possible sequence operation of a system corresponding to FIG. 5 or FIG. 6.

The flow diagram of FIG. 7 involves the following sequence steps:

| | |
|---|---|
| 20- | Start |
| 21- | Is the system in initialisation phase? |
| 22- | Are both front brake pressures > zero and = master cylinder pressure: |
| 23- | Is pedal travel > zero and within range expected for push-through at this pressure? |
| 24- | Are both rear brake pressures = zero? |
| 25- | Set initial EHB demand : Front axle = Zero. Rear axle = Zero |
| 26- | Set final EHB demand : Front axle = Zero. Rear axle = f (present m/cylinder) pressure. |
| 27- | Set maximum rear axle demand rise rate = (final value − initial value)/adaption period. |
| 28- | End. |

The principle and mode of operation of this invention have been described in its preferred embodiments. However, it should be noted that this invention may be practiced otherwise than as specifically illustrated and described without departing from its scope.

What is claimed is:

1. An electro-hydraulic braking (EHB) system of the type which operates normally in an EHB mode wherein hydraulic pressure is applied to braking devices at wheels of the vehicle in proportion to a driver's braking demand as sensed electronically at a brake pedal, but which, if a brake-by-wire mode should fail, operates in a push-through mode wherein hydraulic pressure is applied to the braking devices at the vehicle wheels by way of a master cylinder coupled mechanically to a brake pedal, characterized by: means for recognizing the existence of a push-through condition during power-up of the EHB controller; and means for setting an initial EHB demand at one of a prevailing push-through braking level and a prevailing deceleration level, said means then adapting the EHB demand smoothly to a desired EHB demand.

2. An electro-hydraulic braking system as claimed in claim 1, having means by which, after power-up of the EHB controller, the initial EHB demand is held for a predefined time interval at one of the prevailing push-through braking level and the prevailing deceleration level, at least for a front brake.

3. An electro-hydraulic braking system as claimed in claim 1, having means by which the adaption of the EHB demand is arranged to occur not before the brake pedal is first released after power-up of the EHB controller, at least for a front brake.

4. An electro-hydraulic braking system as claimed in claim 1, having means by which the adaption of the EHB demand is arranged to follow a substantially straight line characteristic from the initial EHB demand set at one of the prevailing push-through braking level and the prevailing deceleration level to the desired EHB demand, at least for a front brake.

5. An electro-hydraulic braking system as claimed in claim 1, having means by which initial EHB brake pressure for a rear brake is set at zero and gradually adapted, by one of a curved line and a straight line, to match an EHB brake pressure for a front brake.

6. An electro-hydraulic braking system as claimed in claim 1, wherein said means are arranged to recognize the existence of the push-through condition during power-up of the EHB controller by the occurrence of at least one of:

a. each of a pair of front brake pressures are equal to a master cylinder pressure, and both pressures are greater than zero, b. a pedal travel of the brake pedal is greater than zero and within a range of travel expected for a push-through at that pressure, and c. both of a pair of rear brakes have a pressure equal to zero.

7. An electro-hydraulic braking system as claimed in claim 1, having means by which initial EHB demand for a front axle brake is set at a prevailing master cylinder pressure level, an initial EHB demand for a rear axle brake is set at zero, and a final EHB demand level for both the front and rear axle brakes is set at a predetermined function of the prevailing master cylinder pressure.

8. An electro-hydraulic braking system as claimed in claim 5, wherein said means for setting EHB demand sets a maximum rear axle demand rise rate to be equal to a ratio of the final desired EHB demand level and a desired adaption period.

9. A method of controlling an electro-hydraulic braking (EHB) system of the type which operates normally in an EHB mode wherein hydraulic pressure is applied to braking devices at wheels of a vehicle in proportion to a driver's braking demand as sensed electronically at a brake pedal, but which, if a brake-by-wire mode should fail, operates in a push-through mode wherein hydraulic pressure is applied to the braking devices at the vehicle wheels by way of a master cylinder couple mechanically to a brake pedal, characterized by: arranging for the existence of a push-through condition to be recognized during power-up of the EHB controller; setting an initial EHB at one of a prevailing push-through braking level and a prevailing deceleration level; and then adapting the initial EHB demand smoothly to a desired EHB demand.

10. The method as claimed in claim 9, comprising holding the initial EHB demand for a predefined time interval at one of the prevailing push-through braking level and the prevailing deceleration level after power-up of the EHB controller, at least for a front brake.

11. The method as claimed in claim 9, comprising arranging for the adaption of the EHB demand to occur not before the brake pedal is first released after power-up of the EHB controller, at least for a front brake.

12. The method as claimed in claim 9, comprising arranging for the adaption of the EHB demand to follow a substantially straight line characteristic from the initial EHB demand set at one of the prevailing push-through braking level and the prevailing deceleration level to the desired EHB demand, at least for a front brake.

13. The method as claimed in claim 9, comprising setting an initial EHB brake pressure for a rear brake at zero and gradually adapting same by one of a curved line and a straight line, to match an EHB brake pressure for a front brake.

14. The method as claimed in claim 9, comprising arranging for the existence of the push-through condition during power-up of the EHB controller to be recognized by the occurrence of at least one of:
 a. each of a pair of front brake pressures are equal to a master cylinder pressure, and both pressures are greater than zero,
 b. a pedal travel of the brake pedal is greater than zero and within a range of travel expected for a push-through at that pressure, and
 c. both of a pair of rear brakes have a pressure equal to zero.

15. The method as claimed in claim 9, comprising setting an initial EHB demand for a front axle brake at a prevailing master cylinder pressure level, setting an initial EHB demand for a rear axle brakes at zero, and setting a final EHB demand level for both the front and rear axle brakes at a predetermined function of the prevailing master cylinder pressure.

16. The method as claimed in claim 13, comprising setting a maximum rear axle demand rise rate to be equal to a ratio of the final desired EHB demand level and a desired adaption period.

17. An electro-hydraulic braking (EHB) system for a vehicle, wherein in an EHB mode, hydraulic pressure is applied to a brake at a wheel of the vehicle in proportion to a vehicle driver's braking demand as sensed electronically at a brake pedal, wherein the system can operate in a push-through mode in which hydraulic pressure is applied to the brake by a master cylinder coupled mechanically to the brake pedal when the vehicle driver exerts a pressure on the brake pedal, comprising:
 means for power-up of the EHB controller;
 means for recognizing a push-through braking condition during the power-up of the EHB controller;
 means for determining one of a prevailing push-through braking pressure level and a prevailing deceleration level; and
 pressure demand control means for controlling EHB pressure demand level, said pressure demand control means setting an initial EHB pressure demand level equal to the one of the determined prevailing push-through braking pressure level and the prevailing deceleration level following power-up of the EHB controller, said pressure demand control means subsequently changing the EHB pressure demand level smoothly to a final desired EHB pressure demand level.

18. The EHB system according to claim 17, wherein the brake is a front brake and the vehicle further has a rear brake, said pressure demand control means maintaining the initial EHB pressure demand level for a predetermined time interval for at least the front brake.

19. The EHB system according to claim 17, wherein the brake is a front brake at a front wheel of the vehicle and the vehicle further has a rear brake at a rear wheel of the vehicle, and wherein upon recognition of a push-through braking condition during power-up of the EHB controller, said EHB system continues operating the front brake in the push-through mode until pressure is no longer exerted by the vehicle driver on the brake pedal, and begins operating the rear brake in the EHB mode until pressure is no longer exerted by the vehicle driver on the brake pedal.

20. The EHB system according to claim 19, wherein a plot of the change of brake pressure versus time describes a substantially straight line during the period of time EHB pressure demand level changes from the initial EHB pressure demand level to the final desired EHB pressure demand level for at least the front brake.

21. The EHB system according to claim 20, said EHB pressure demand control means for setting an initial EHB pressure level of zero for the rear brake following EHB system initialization, said EHB pressure demand control means subsequently increasing the rear brake EHB pressure demand level to equal the final desired EHB pressure demand level of the front brake.

22. The EHB system according to claim 21, wherein a plot of the change of a rear brake pressure versus time describes one of at least a straight line and a curved line during the period of EHB pressure demand level change from the initial EHB pressure level to the EHB pressure level of the front brake.

23. The EHB system according to claim 17, wherein the brake is one of a pair of front brakes and the vehicle further has a pair of rear brakes, and said means for recognizing a push-through braking condition during the initialization of said EHB system recognizes the push-through braking condition by the occurrence of at least one of the following conditions:

a. both front brakes having pressures equal to a master cylinder pressure with both front brake pressures and master cylinder pressure being greater than zero;

b. a travel distance of the brake pedal is greater than zero and within a predetermined range of travel in a push-through mode of operation for the given master cylinder pressure; and c. both rear brakes having a pressure equal to zero.

24. The EHB system according to claim 17, wherein the brake is a front brake and the vehicle further has a rear brake, and said pressure demand control means:

sets an initial EHB pressure demand level for the front brake at the prevailing push-through braking pressure level as determined from a prevailing pressure of the master cylinder;

sets an initial EHB pressure demand level for the rear brake at zero; and sets a final desired EHB pressure demand level both the front brake and the rear brake at a level which is a predetermined function of the prevailing pressure of the master cylinder.

25. The EHB system according to claim 24, including means for increasing the rear brake EHB pressure at a rate no greater than a ratio of the final desired EHB pressure demand level and a desired time interval.

26. A method of controlling an electro-hydraulic braking (EHB) system for a vehicle, wherein in an EHB mode, hydraulic pressure is applied to a brake at a wheel of the vehicle in proportion to a vehicle driver's braking demand as sensed electronically at a brake pedal, wherein the system can operate in a push-through mode in which hydraulic pressure is applied to the brake by a master cylinder coupled mechanically to the brake pedal, the method comprising:

commencing power-up of the EHB controller;

recognizing a push-through braking condition during power-up of the EHB controller;

determining one of a prevailing push-through braking pressure level and a prevailing deceleration level;

setting an initial EHB pressure demand level equal to the one of the determined prevailing push-through braking pressure level and the prevailing deceleration level; and changing the initial EHB pressure demand level smoothly to a final desired EHB pressure demand level.

27. The method according to claim 26, wherein the brake is a front brake at a front wheel of the vehicle and the vehicle further has a rear brake at a rear wheel of the vehicle, and the initial EHB pressure demand level is maintained for a predetermined time interval for at least the front brake.

28. The method according to claim 26, wherein the brake is a front brake at a front wheel of the vehicle and the vehicle further has a rear brake at a rear wheel of the vehicle, and subsequent to recognizing a push-through braking condition during power-up of the EHB controller, the method comprising:

operating the front brake in the push-through mode until a pressure exerted by the vehicle driver on the brake pedal in released by the vehicle driver; and operating the rear brake in the EHB mode until the pressure exerted by the vehicle driver on the brake pedal is released by the vehicle driver.

29. The method according to claim 28, wherein a plot of the change of brake pressure versus time describes a substantially straight line during the period of time when the EHB pressure demand level changes from the initial EHB pressure demand level to the final desired EHB pressure demand level for at least the front brake.

30. The method according to claim 29, wherein the rear brake is set to have initial EHB pressure level of zero following power-up of the EHB controller, the initial rear brake EHB pressure being subsequently increased to an EHB pressure level of the front brake.

31. The method according to claim 30, wherein a plot of the change of a rear brake EHB pressure versus time describes one of at least a straight line and a curved line during the period of time when EHB pressure demand level changes from the initial EHB pressure level to the EHB pressure level of the front brake.

32. The method according to claim 26, wherein the brake is a front brake and the vehicle further has a rear brake, and the push-through braking condition is recognized by the occurrence of at least one of:

a. a front brake EHB pressure is equal to a master cylinder pressure and both the front brake EHB pressure and a master cylinder pressure are greater than zero;

b. a travel distance of the brake pedal is greater than zero and within a predetermined range of travel in a push-through mode of operation for the given master cylinder pressure; and c. a rear brake EHB pressure is zero.

33. The method according to claim 26, wherein the brake is a front brake and the vehicle further has a rear brake, and said step of setting an initial EHB pressure demand level includes the steps of:

a. setting an initial EHB pressure demand level for the front brake at the prevailing push-through braking pressure level as determined from a prevailing pressure of the master cylinder;

b. setting an initial EHB pressure demand level for the rear brake at zero; and c. setting a final desired EHB pressure demand level for the front brake and the rear brake as a function of the prevailing master cylinder pressure level.

34. The method according to claim 29, wherein a rear brake EHB pressure will increase at a rate no greater than a ratio of the final desired EHB pressure demand level and a desired time interval.

35. An electro-hydraulic braking (EHB) system for vehicle, wherein in an EHB mode, hydraulic pressure is applied to a pair of front brakes at a front axle and a pair of rear brakes at a rear axle of the vehicle in proportion to a vehicle driver's braking demand as sensed electronically at a brake pedal, and wherein the system can operate in a push-through mode in which hydraulic pressure is applied to the brakes by a master cylinder coupled mechanically to the brake pedal, comprising:

a device for detecting power-upon the EHB controller, said device generating a signal indicating the detection of the power-up of the EHB controller;

a first front brake sensor for detecting a pressure of a first one of the front brakes, said sensor generating a first front brake pressure signal;

a second front brake sensor for detecting a pressure of a second one of the front brakes, said sensor generating a second front brake pressure signal;

a sensor for detecting a pressure of the master cylinder, said sensor generating a master cylinder pressure signal;

a sensor for detecting an amount of pedal travel of the brake pedal, said sensor generating a pedal travel signal;

a first rear brake sensor for detecting a pressure of a first one of the rear brakes, said sensor generating a first rear brake pressure signal;

a second rear brake sensor for detecting a pressure of a second one of the rear brakes, said sensor generating a second rear brake pressure signal;

an electronic control unit (ECU) for receiving and comparing the generated signals from said device for detecting power-up of the EHB controller, said first front brake sensor, said second front brake sensor, said sensor for detecting a pressure of the master cylinder, said sensor for detecting an amount of pedal travel of the brake pedal, said first rear brake sensor, and said second rear brake sensor, said ECU setting an initial EHB demand level for the front brakes and an initial EHB demand level for the rear brakes, determining a desired EHB demand level based on said master cylinder pressure signal, a maximum front brake pressure demand rise rate and a maximum rear brake pressure demand rise rate for smoothly transitioning from said initial EHB demand levels for said front brakes and said rear brakes, wherein said ECU detects the existence of a push-through condition by at least one of:

a. comparing the pressure signals of each of the first and second front brake with the master cylinder pressure signal, said ECU determining a push-through condition exists wherein the each of the pair of front brake pressure signals and the master cylinder pressure signal are equal and are not equal to zero;

b. comparing the pedal travel signal to a predetermined range of expected pedal travel during a push-through condition, said ECU determining a push-through condition exists when the pedal travel signal is greater than zero and within the predetermined range of expected pedal travel during a push-through condition; and c. comparing each of the rear brake pressure signals, said ECU identifying a push-through condition exists when each of the rear brake pressure signals are equal to zero.

* * * * *

UNITED STATES PATENT AND TRADEMARK OFFICE
CERTIFICATE OF CORRECTION

PATENT NO.   : 6,588,855 B2
DATED        : July 8, 2003
INVENTOR(S)  : Alan Leslie Harris It is certified that error appears in the above-identified patent and that said Letters Patent is hereby corrected as shown below:

Column 8,
Line 50, delete "EHB system initialization" and insert -- power-up of the EHB controller --.
Line 64, delete "the initialization of said EHB system" and insert -- power-up of the EHB controller --.

Column 10,
Line 52, delete "power-upon" and insert -- power-up of --.

Signed and Sealed this

Thirtieth Day of September, 2003

JAMES E. ROGAN
*Director of the United States Patent and Trademark Office*